Figure 1:
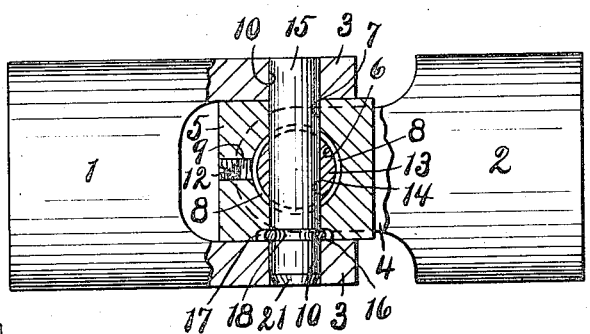

G. V. CURTIS.
UNIVERSAL JOINT.
APPLICATION FILED MAY 15, 1918.

1,323,023.

Patented Nov. 25, 1919.

WITNESS:
A. C. Fairbanks

INVENTOR.
George V. Curtis,
BY
Frank A. Cutter,
ATTORNEY.

UNITED STATES PATENT OFFICE.

GEORGE V. CURTIS, OF WEST SPRINGFIELD, MASSACHUSETTS.

UNIVERSAL JOINT.

1,323,023.            Specification of Letters Patent.            Patented Nov. 25, 1919.

Application filed May 15, 1918. Serial No. 234,802.

*To all whom it may concern:*

Be it known that I, GEORGE V. CURTIS, a citizen of the United States of America, residing at West Springfield, in the county of Hampden and State of Massachusetts, have invented a new and useful Universal Joint, of which the following is a specification.

My invention relates to improvements in joints of the universal type such as are used in the capacity of flexible connectors between obliquely disposed, revoluble members, or between rotative members which are relatively subject to deflection or angular adjustment, such as shafts, and more particularly to the means whereby the smaller or key spindle is held securely in place, and said invention consists of a construction and arrangement which include expansible holding means, such as one or more split-rings, all as hereinafter set forth.

This invention is in the nature of an improvement of the universal joint which is the subject of my application for Letters Patent of the United States, Serial No. 141,669.

The primary object of my invention is to provide a universal joint which comprises two coupling-heads, stubs, or shaft-sections having bifurcated ends, a center block, a spindle having its ends inserted in the fork arms or prongs of one shaft-section and rotatable therein, said spindle passing through said block, and a second spindle having its ends inserted in the fork arms or prongs of the other shaft-section and rotatable therein, said second-named spindle also passing through said block and through said first-named spindle, with simple, convenient, inexpensive, durable and safe means for locking the parts together.

The lock is applied directly to the smaller or key spindle and bears on one or more of the parts which carry said spindle, according to the position and number of the split-rings employed, without interfering with the free action of the relatively movable members. The key spindle is held against endwise movement by the split-ring or rings, and in turn holds the larger spindle against endwise movement, and the two spindles keep the other members in place while serving as axes upon which the shaft-sections rock as they revolve upon their longitudinal or principal axes.

Another object is to provide locking means for a universal joint which means is of such a nature that the parts can be easily and quickly assembled and taken apart. No pins, screws, or elements of a similar nature, or which require mutilation either when applied or removed, are employed in this case.

Other objects and advantages will appear in the course of the following description.

I attain the objects and secure the advantages of my invention by the means illustrated in the accompanying drawings, in which—

Figure 2:
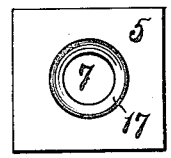
Figure 3:
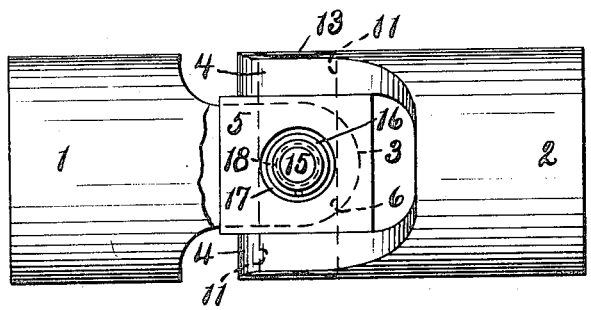

Figure 1 is a central section through a universal joint which embodies a practical form of my invention, such section being taken lengthwise of the joint, and the outer end portions of the coupling-heads shown being in elevation; Fig. 2, a bottom plan of the center block as the same is disposed in the first view; Fig. 3, a bottom plan of said joint as it is disposed in said first view, the fork arm which is nearer to the beholder, of the left-hand coupling-head being broken off, as in the first view the near fork arm of the right-hand coupling-head is broken off, and, Fig. 4, a side elevation of a universal joint which embodies a modification of the locking means, one of the split-rings being in section.

Like numerals designate like parts throughout the several views.

Figure 4:
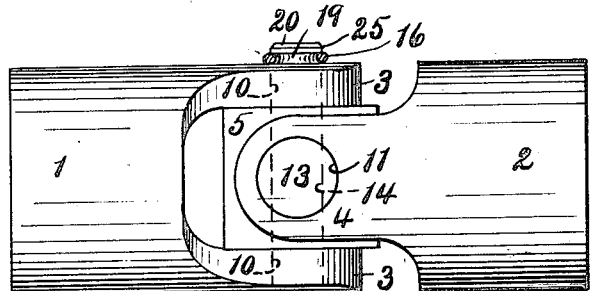

I have shown in each of Figs. 1, 3, and 4 two coupling-heads having the usual bifurcated ends, and although such coupling-heads are alike and both pairs of fork arms are generally alike, I will use different designating numerals for the two coupling-heads and other different designating numerals for the two pairs of arms, in order to make it easier to understand clearly the description of the other parts and members of the joint. One of the coupling-heads is, therefore, designated by the numeral 1 and the other by the numeral 2, while the arms of the first are designated by the numeral 3 and those of the second by the numeral 4.

It is to be understood that this universal joint, although illustrated in a prone position and so described, may just as well be placed upstanding; and it should be noted in passing that the term "coupling-head" as employed herein is intended to include stubs, shaft sections, and other similar elements, which have adjacent end bifurcations for universal-joint purposes.

A center block 5 is provided to fit between the arms in the two pairs (2 and 4), and is bored through in two directions, as at 6 and 7, and said block may also have therein a central, annular groove 8, and a passage 9 leading from one side of the block into said groove. The block 5 is faced off on four sides, one pair of such sides being diametrically opposite to the other pair, and the arms 3 and 4 are faced off on the inside, as usual, so that said block and arms have a good sliding or operating fit. The bore 6 is larger than the bore 7, and said bores are central to the block 5 meeting in the center thereof, and are at right-angles to each other. The arms 3 are bored midway between their lateral edges, at 10—10, and the bore 7 is in line with such openings in said arms, and the arms 4 are bored midway between their lateral edges, as at 11—11, and the bore 6 is in line with these openings, when the block 5 is in position. The groove 8 and the passage 9 are in the same plane. The groove 8 is really an enlargement of the transversely central part of the bore 6, and is divided by the bore 7 and the passage 9 into three sections. The passage 9 opens at the inner end into said groove and at the outer end through one of the sides of the block 5 that is otherwise imperforate, said passage, in this case, being in the major axis of the coupling-head 1. The passage 9 and the groove 8 are for oil or other lubricant, as will presently be more fully explained. A screw cap or plug 12 is tapped into the other end of the passage 9.

The openings 10 might just as well be in the arms 4 and the openings 11 in the arms 3, the position of the block 5 then being changed so that the smaller bore would aline with the smaller openings and the larger bore with the larger openings.

A spindle 13 is inserted in the bore 6, extends through such bore and projects beyond the sides of the block 5 through which such bore opens, and has projecting terminals journaled or received in the openings 11 in the arms 4. This spindle has a central transverse opening 14 through the same.

A spindle 15 (or 25), of smaller diameter than the spindle 13, is inserted in the bore 7 and the opening 14, extends through such bore and projects beyond the sides of the block 5 through which such bore opens, and has such projecting terminals journaled or received in the openings 10 in the arms 3. The spindle 15 (or 25) may be termed the "key" spindle, because, when said spindle is in place and secured against endwise movement, it holds the spindle 13 against endwise movement, and neither said spindles nor the block 5 can become displaced.

As locking or securing means for the key spindle I may employ a split-ring or rings 16, either interiorly as in Figs. 1 and 3, or exteriorly as in the last view. In the first example a single split-ring 16 is usually sufficient, while in the second example two split-rings are required.

Referring to the first three views, it will be observed that an annular groove 17 is provided in one of the faces of the block 5 through which the spindle 15 extends, and that such groove encircles the bore 7. An exterior, annular groove 18 is formed in the spindle 15, such groove being in the same plane with the groove 17, when said spindle is in place. The split-ring 16 here employed in part is received in the groove 18, and in part lies in the groove 17 between the inner wall or portion of said last-named groove and the inside face of the adjacent arm 3, thus holding said spindle against endwise movement, but without materially interfering with any rotation or partial rotation of said spindle that might be incidental to the operation of the joint. The diameter of the groove 17 is sufficiently large to enable the split-ring 16 therein to expand or be expanded to the necessary extent, when the spindle 15 is inserted in place and when it is removed.

Referring to the last view it will be seen that the spindle 25, when in place as therein shown, protrudes from the arms 3, and has an annular groove 19 in each side of such protruding terminals, just outside of said arms. A split-ring 16 is forced on over each protruding end of the spindle 25 and into the groove 19 at that end, and projects sufficiently to engage the outer face of the adjacent arm 3. The spindle 25 is held against endwise movement by the two split-rings outside of the arms 3, but is free to turn as in the other case. The ends of the spindle 25 are beveled or tapered as shown at 20—20, to facilitate the operation of placing the split-rings therein, and the end of the spindle 15 which is nearer the groove 18 is similarly beveled, as at 21, to facilitate the act of forcing said last-named spindle through its split-ring.

The split-rings 16 open or expand to receive the spindles 15 and 25, and then contract when they enter the grooves (18 and 19). The depth of the groove 18 and that of each of the grooves 19 is equal to about one-half of the diameter in cross-section of the split-ring 16 which is received therein, so that the latter extends sufficiently beyond its groove to interlock with or engage contiguous parts either of the block 5 and one of the arms 3, or of both arms 3.

Great freedom of movement is permitted to the members of this joint.

The manner of assembling the parts to make up the joint will readily be understood from the foregoing description and upon reference to the drawings. The block 5 is first placed in position between the plane surfaces of the arms 4, with the bore 6 in alinement with the openings or bearing sockets 11 in said arms, next the spindle 13 is inserted in said bore and bearing sockets, then said block is introduced between the plane surfaces of the arms 3, one of the split-rings 16 having been placed in the groove 17, in said block, if the key spindle 15 is to be used, and finally said key spindle or the key spindle 25 is inserted in its bore and bearing sockets, two of said split-rings being applied to the latter key spindle.

The beveled end of the spindle 15 is inserted first in the bearing socket which is the more remote from the split-ring 16 in the groove 17, said spindle is pushed along until said end encounters such ring, when said end expands and passes into and through the ring, the latter spreading out in said groove, and said spindle is advanced still more until the groove 18 reaches the ring, when said ring enters and contracts in said last-named groove and locks said spindle against longitudinal movement, by reason of the engagement of the projecting portions of the ring with the embracing or confining surfaces of the block 5 and the contiguous arm 3. By applying a sufficiently powerful driving force to one end or the other, preferably the beveled end, of the spindle 15, the split-ring 16 in the groove 18 is expanded to release said spindle and permit the same to be removed entirely, when the other members of the joint can easily be taken apart. No ordinary operation of the joint, however, will cause the grooved part of the spindle 15 to force open the engaging split-ring 16 and release said spindle.

The two split-rings 16 on the key spindle 25 are forced on over the beveled ends of said spindle and against the outer faces of the arms 3, when such rings spring into the grooves 19 and so secure the spindle against movement lengthwise. If it be desired to remove the spindle 25 for any reason, one or both of the locking rings are forced out of their grooves and said spindle is thus released. A driving force applied to one or the other end of the spindle 25 is usually the medium through which release is effected.

The passage 9 and the groove 8 are kept supplied with lubricant introduced into said passage when the cap or plug 12 is removed, such lubricant working around the spindle 15 (or 25) into all parts of said groove. From the groove 8 the lubricant works outwardly along the full length of both spindles, and is thus supplied and applied to all the bearing parts. Not only is provision thus made for lubricating the parts, but also for an even or uniform distribution of the lubricant thereto.

Necessarily the bore 7 is in two parts which open interiorly into the center, transversely, of the bore 6.

Certain modifications in the shape, size, arrangement, and construction of some or all of the parts of my universal joint may be made without departure from the spirit of my invention, and in this connection it is to be understood that the term "split-ring" is intended to include any and all mechanical equivalents of the split-ring.

What I claim as my invention, and desire to secure by Letters Patent, is—

A universal joint comprising bifurcated coupling-heads having bearing-socket members, a block between said members, spindles intersecting each other and said block and journaled in said members, one of said spindles being a key spindle and having an annular groove therein, said block also having an annular groove therein in the same plane with said first-named groove, when the parts are in place, and opening outwardly against the inner face of one of said members, and a split-ring wholly receivable in the groove in said block and partially receivable in the groove in said key spindle, and when in place being held against lateral movement in either direction by contiguous parts of said block and one of said members and interlocking said key spindle with such parts, for the purpose set forth.

GEORGE V. CURTIS.

Witnesses:
A. C. FAIRBANKS,
F. A. CUTTER.